Figure 1:
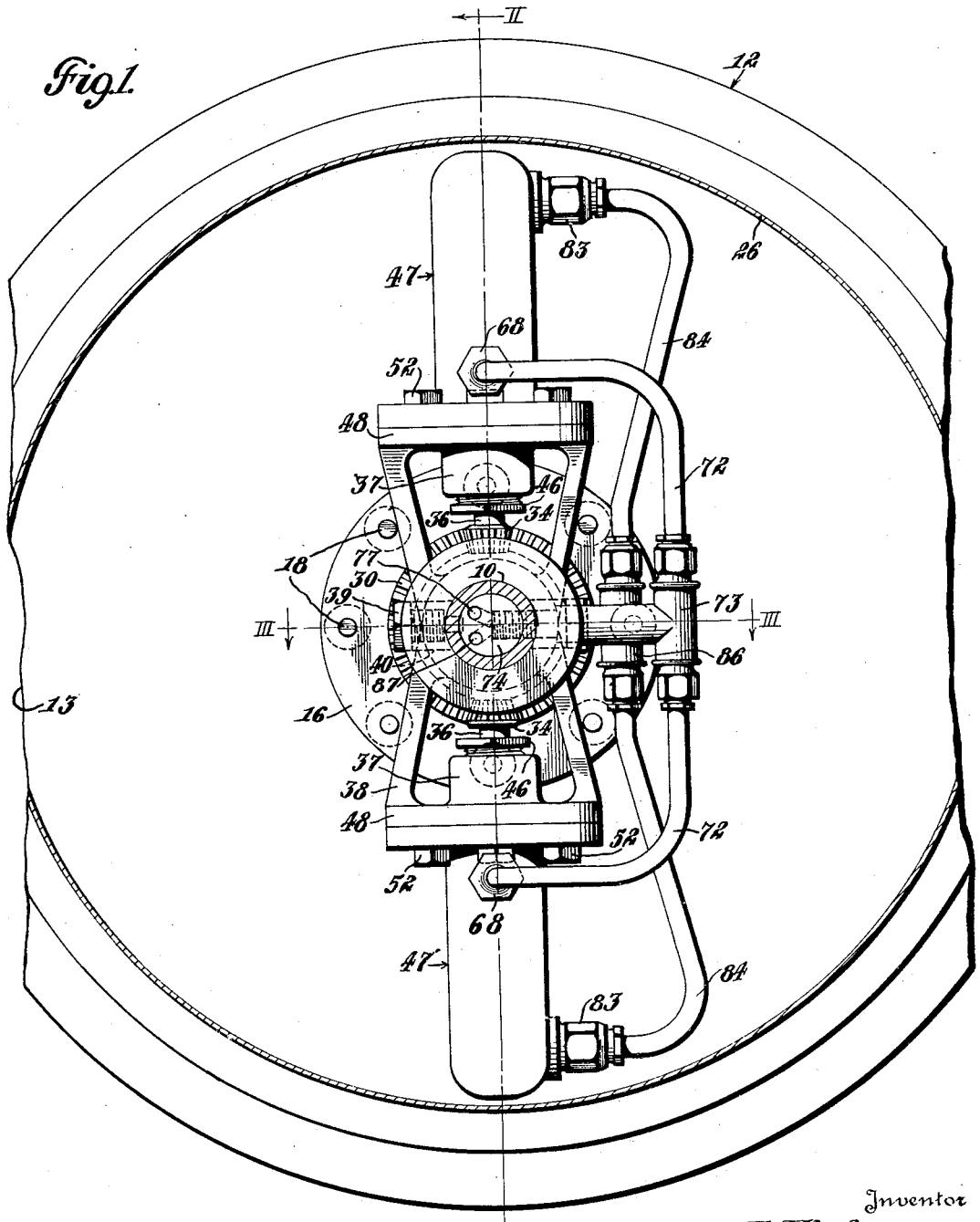

Sept. 12, 1933.  F. E. FLADER  1,926,988
HYDRAULIC BRAKE
Filed Oct. 19, 1931   2 Sheets-Sheet 1

Inventor
Frederic E. Flader,
By Bean Brooks & Henry,
Attorney

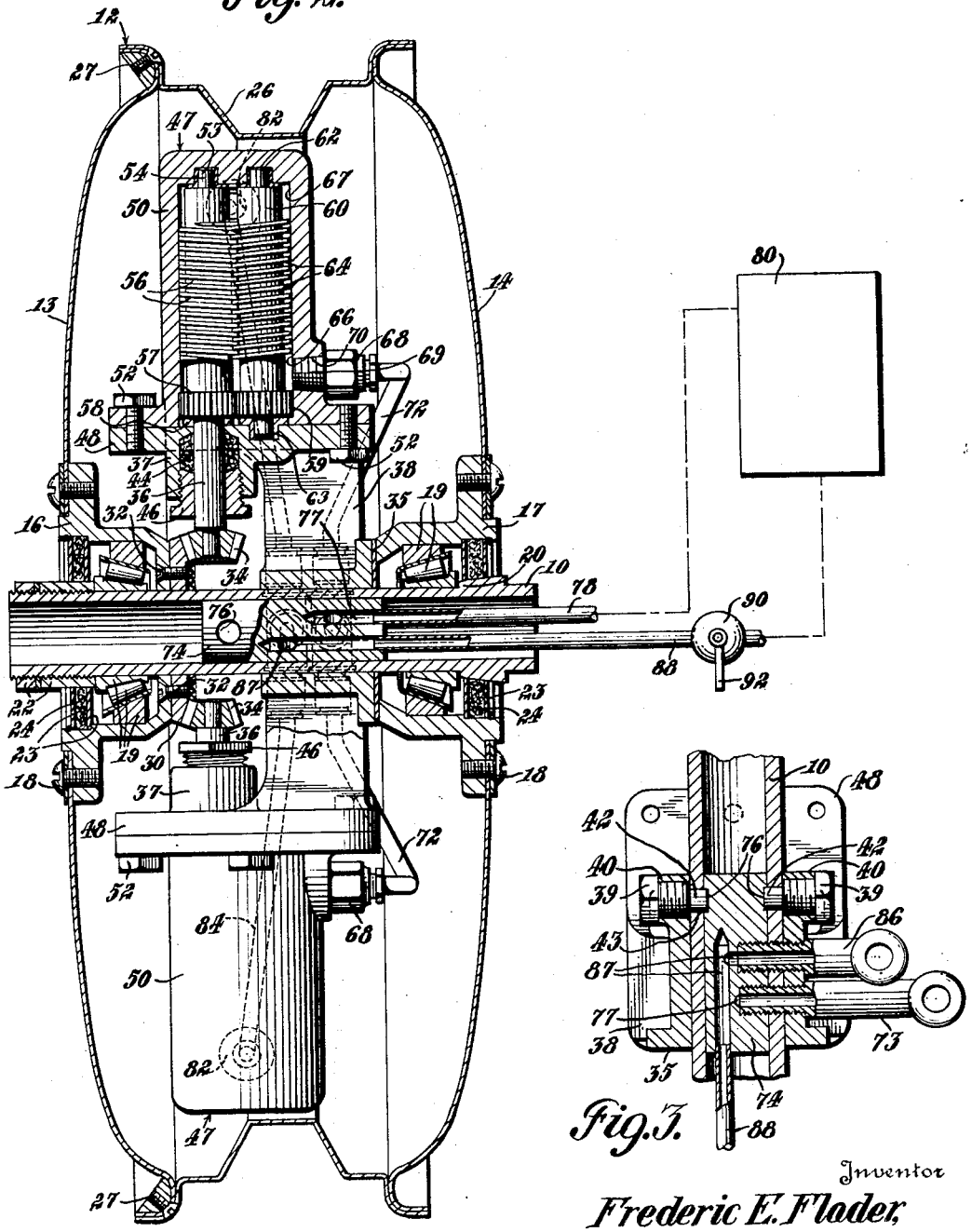

Patented Sept. 12, 1933

1,926,988

UNITED STATES PATENT OFFICE 1,926,988

HYDRAULIC BRAKE

Fredric E. Flader, Morrisville, Pa., assignor of one-third to Fred Dobmeier, Buffalo, N. Y.

Application October 19, 1931. Serial No. 569,809

7 Claims. (Cl. 188—92)

This invention relates to hydraulic brakes and it has particular relation to the type of hydraulic brake in which the braking action is accomplished by resistance to forced flow of fluid through controlled openings.

The invention contemplates a hydraulic brake which is particularly adapted to be employed in conjunction with the undercarriage of vehicles, such as the landing equipment of aircraft, although the wheels of other types of vehicles are suitable for application of the invention. The brake is so constructed that it is not necessary to employ frictional braking surfaces and the rotation of the wheel provides the power for forcing fluid through openings that are controlled at will by the vehicle operator to such degree that the wheels may even be locked. Other features of the invention include the installation of the operating parts of the brake within the outline or boundaries of the wheel, thereby facilitating its streamlining, and only relatively small fluid conduits leading from the wheel to the body of the vehicle are necessary for the actuation of the brake. A suitable supply of liquid is located upon the body of the vehicle. This fluid supply may be in the form of a tank or shock absorbers on the vehicle undercarriage. The streamlining of the vehicle is not adversely affected by the brake, and no appreciable wind resistance is offered by the installation thereof because it is located within the boundaries of other vehicle elements.

For a better understanding of the invention reference may now be had to the accompanying drawings forming a part of this specification, of which Fig. 1 is a fragmentary elevation of a hydraulic brake, an axle and wheel with which it is associated being shown in cross-section;

Fig. 2 is a cross-section taken substantially along the line II—II of Fig. 1; and Fig. 3 is a fragmentary cross section taken substantially along the line III—III of Fig. 1.

In practicing the invention a tubular metallic axle 10 is provided which constitutes a stationary portion of a landing gear or undercarriage of an aircraft or other vehicle. A disc wheel 12 mounted on the axle comprises a pair of spaced discs 13 and 14 and central bearing housings 16 and 17 that are rigidly secured as indicated at 18, to the discs and are provided with roller bearing members 19 upon the axle. These bearing members are positioned and maintained in their proper relation with respect to the inner portion of the axle by means of an annular shoulder 20 and with respect to the outer end of the axle by means of nuts 22. Packing rings 23 having packing material 24 therein surround the axle in the bearing housing and serve to protect the bearing members. A tire carrying rim 26 is rigidly secured, as indicated at 27, to the outer circumferential portions of the discs to complete the wheel assembly.

As best shown by Fig. 2 a beveled gear 30 surrounding the axle is secured by means of machine screws 32, or the like, to the inner face of the bearing housing 16 and accordingly is rotatable with the wheel about the stationary axle. Diametrically opposite, beveled gears 34 meshing with the gear 30 are rigidly secured to the inner ends of shafts 36 that are disposed radially with respect to the axle 10 and are mounted in bearing bosses 37 on a casting 38 located within the disc wheel. A central portion of the casting surrounds the axle and provides a bearing 35 against which the housing 17 abuts in opposed relation to the gear 30. Relatively short bolts 39 screw threaded through bosses 40 that are integral with the casting are provided with dowel end portion 42 projecting through openings 43 in diametrically opposite sides of the tubular axle and slightly beyond the inner wall surfaces of the latter.

Suitable gland packing 44 and a gland nut 46 threaded into the bearing boss 37 provide a fluid tight bearing connection for each shaft 36. These shafts constitute the principal elements of fluid pumps 47 which are identical in construction and accordingly a detailed description of one of them will adequately suffice for a thorough understanding of both.

The portion of the casting in which the bearing boss 37 is located is in the form of an integral plate 48 for receiving a flanged housing 50 rigidly bolted thereto, as indicated at 52. A thrust bearing 53 in the outer end of the housing receives an outer end portion 54 of the shaft and an intermediate portion of the shaft in the housing is provided with a screw threaded portion 56. A gear 57 rigidly secured to the shaft 36 in the inner end portion of the housing 50 is spaced from the bearing member 37 by means of a washer 58 and intermeshes with a similar gear 59 that is rigidly secured to a shaft 60 having bearings 62 and 63 at its opposite ends in the housing 50 and plate 48 respectively. An intermediate portion of the shaft 60 is in the form of screw threads 64 intermeshing with the threads 56 of the shaft 36. It will be observed that the threaded portions 56 and 64 are reversely formed, that is, one of them is in the form of right hand threads and the other in the form of left hand threads. The diameters of the threaded portions of the shaft is slightly greater than the diameters of the end portion thereof and substantially fluid tight chambers 66 and 67 are thus provided beyond the opposite ends of the threaded portions of the shafts. The housing 50 fits snugly about the screw threaded portions of the shafts 36 and 60.

A hollow conduit joint fitting 68 having a tapered portion 69 threaded tightly into an inwardly tapered opening 70 and communicating with the chamber 66, is secured to one end of a conduit 72. The other end of the conduit 72 is connected to a tubular conduit fitting 73 threaded through the casting 38, the tubular axle, and into a cylindrical plug 74 that fits tightly within the tubular axle. The projecting ends 42 of the bolt 39 engage firmly in recesses 76 in the plug and assist in maintaining it rigidly within the axle. The tubular conduit 72 and chamber 66 are in open communication through ducts 77 and a conduit 78 with a fluid supplying device 80, such as an oil tank or shock absorber which is illustrated diagrammatically in Fig. 2.

In like manner the upper or outer chamber 67 is provided with a tapered opening 82 in which a conduit fitting 83 is secured in threaded relation for communication with the fluid supplying device 80 by means of a conduit 84, tubular fitting 86, an angular duct 87 in the plug 74, and a conduit 88 secured in the plug 74. A valve 90 in the conduit 88 is provided with an actuating member 92 that is accessible to the operator of the vehicle or aircraft upon which the brake is installed for the purpose of controlling or regulating the flow of fluid therethrough.

In the operation of the brake described the fluid supply device 80 is filled with suitable fluid such as oil which circulates through the various conduits described into the chambers 66 and 67. As soon as the wheel 12 begins to rotate upon the ground the threaded shafts 36 and 60 are rotated by means of the gears 30 and 34, and the inter-meshing threaded portions 56 and 54 thereof of pump oil from the chamber 66 into the chamber 67. The amount of resistance offered by the flow of pump fluid depends upon the rapidity of the rotation of the wheel and also upon the amount of fluid that is permitted to pass through the valve 90. When the valve is open the resistance is relatively small and thus the resistance can be graduated by gradually opening and closing the valve. If the valve is closed a very strong resistance is offered which will lock the wheel against rotation, assuming that there is no fluid leakage in the system.

From the foregoing description it will be apparent that a very positive and efficient braking construction has been provided which avoids the wear and tear ordinarily incurred in using brakes having frictional surfaces. This type of brake does not interfere in any manner with the streamlining of an aircraft and in view of the fact that the wheels are only rotated at intervals when the craft is at the ground the braking elements are subjected to relatively slight wear and tear.

Although only one form of the invention has been shown and described in detail it will be apparent to those skilled in the art that the invention is not so limited but that various changes may be made without departing from the spirit of the invention or from the scope of the appended claims. Further, any suitable type of pump may be substituted for the screw type shown.

I claim:

1. The combination with a wheel having co-operating discs for supporting a tire rim and an axle rigidly supporting the discs, of a fluid pump mounted within the wheel defined by the discs, means for supplying fluid to the pump, one of said discs having driving means for actuating the pump as the wheel is rotated about the axle, and means for restricting the flow of fluid through the pump to provide a braking action resisting the rotation of the wheel.

2. The combination with a wheel having co-operating discs for supporting a tire rim and an axle therefor, of a stationary support on the axle between the disc, said support having a thrust bearing for bearing against one of the discs a fluid pump mounted upon said support within the wheel defined by the discs, means for supplying fluid to the pump, gearing on the disc opposite the thrust bearing for inter-connecting the wheel and the pump and for actuating the pump when the wheel is rotated about the axle, and means for restricting the flow of fluid through the pump to provide a braking action resisting the rotation of the wheel.

3. The combination with a wheel and an axle rotatably mounted thereon, of a casting mounted upon the axle and including oppositely disposed plate like portions, a pair of pumps mounted upon the plate like portions of the casing, means for supplying fluid to the pumps, common bevel gearing on a rotating part of the wheel for operating the pumps when the wheel is rotated about the axle, and means for restricting the flow of fluid from the pump to provide a braking action resisting the rotation of the wheel.

4. The combination with a wheel and an axle, bearing members rotatably supporting the wheel on the axle, a gear on one of the bearing members, symmetrically arranged fluid pumps, supported by the axle, means for supplying fluid to the pumps, a gear on each pump connected to the first mentioned gear, and means for restricting the flow of fluid from the pumps to provide a braking action resisting the rotation of the wheel.

5. The combination with an axle and a wheel rotatably mounted thereon, of a rotary fluid pump including intermeshing screw members, means for mounting said pump upon the axle, gearing inter-connecting the wheel and pump for operating the pump when the wheel is rotated, the axis of the pump being disposed transversely of the axis of the axle, a closed fluid supply system communicating with the pump, means for controlling the flow of fluid through the pump as the wheel is rotated to provide a gradual variation in braking action against the rotation of the wheel.

6. The combination with an axle and a wheel rotatably mounted thereon, of a pump mounted upon the support, means on the wheels for operating the pump, a closed fluid supply system communicating with the pump, said supply system including an apertured plug mounted axially in the axle, common means for securing said support and plug rigidly with respect to the axle, a valve in the system for controlling the flow of fluid from the pump, and means for actuating the valve as the wheel rotates to provide varying braking action against the rotation of the wheel.

7. The combination with an axle and wheel rotatably mounted thereon, of a casting having a central portion surrounding the axle, symmetrical pumps mounted upon the casting, gearing interconnecting the wheel and pumps, a closed fluid supply system communicating with the pump, said supply system including common conduits communicating with the suction and pressure sides of the pumps, an apertured plug included in the system and mounted axially of the axle, common means for securing the plug and casting rigidly upon the axle, a valve common to both pumps for controlling the flow of fluid from the pumps to provide a braking action against rotation of the wheel.

FREDRIC E. FLADER.